(12) United States Patent
Ozawa et al.

(10) Patent No.: US 6,343,379 B1
(45) Date of Patent: Jan. 29, 2002

(54) RECEIVER AND PROGRAM UPDATING METHOD

(75) Inventors: Toshiro Ozawa, Kanagawa; Koichi Oyama, Tokyo, both of (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/271,554

(22) Filed: Mar. 18, 1999

(30) Foreign Application Priority Data

Mar. 24, 1998 (JP) .......................................... 10-075951

(51) Int. Cl.⁷ .............................. H04N 7/10; H04N 7/20
(52) U.S. Cl. ......................... 725/63; 725/68; 725/132; 725/140; 725/152; 717/11
(58) Field of Search .............................. 725/32, 63–72, 725/132, 140, 152; 717/11; 375/222; 380/242, 232, 278

(56) References Cited

U.S. PATENT DOCUMENTS

| | | | | |
|---|---|---|---|---|
| 5,003,591 A | * | 3/1991 | Kauffman et al. .......... 380/232 |
| 5,440,632 A | * | 8/1995 | Bacon et al. ................ 380/242 |
| 5,526,435 A | * | 6/1996 | Tsumura ..................... 380/278 |
| 5,623,604 A | * | 4/1997 | Russell et al. ................ 717/11 |
| 5,644,594 A | * | 7/1997 | Johnson et al. ............. 375/222 |
| 5,812,857 A | * | 9/1998 | Nelson et al. ................ 717/11 |

* cited by examiner

*Primary Examiner*—John W. Miller
*Assistant Examiner*—Dimitri Tundra
(74) *Attorney, Agent, or Firm*—Lerner, David, Littenberg, Krumholz & Mentlik, LLP (57) ABSTRACT

A receiver, such as that used in broadcasting, is provided with a simplified structure for storing and updating the receiver's control program and for preventing a loss of the control program because of a power outage during such updating. The structure includes a first storage means comprising an erasable, non-volatile memory and a second storage means comprising a volatile memory. The control program is stored in the first storage means and is executed to download and store a second program in the second storage means. The second program then is executed to download and store an updated version of the control program in the first storage means.

39 Claims, 8 Drawing Sheets

RECEIVER AND PROGRAM UPDATING METHOD

FIELD OF THE INVENTION

The present invention relates to a receiver and a program updating method, and more particularly, to a receiver for digital satellite broadcasting and a system and method for updating a control program for such a receiver.

BACKGROUND OF THE INVENTION

Figure 1:
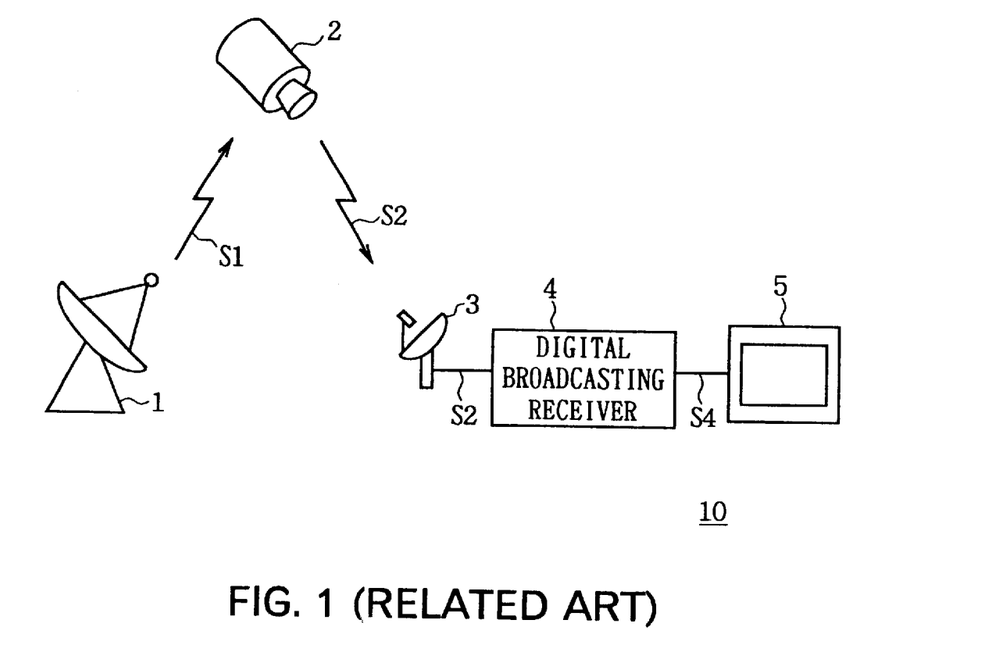
FIG. 1 is a block diagram of a digital broadcasting system.

In digital satellite broadcasting, a television signal in digital form is transmitted using a broadcasting satellite. As shown in FIG. 1, a broadcast signal S1 of digital satellite broadcasting system 10 is transmitted from a transmitting antenna 1, received by a broadcasting satellite 2 and then is amplified and retransmitted as a broadcast signal S2. A digital broadcasting receiver 4 receives the broadcast signal S2 through a receiving antenna 3, demodulates and decodes the signal S2 and then transmits the signal S2 to a television receiver 5 as a video signal S4.

The control program in digital broadcasting receiver 4 must be updated if, e.g., a change in broadcasting services or a problem in the program (a "bug") occur. To enable such updating, the control program has been stored in an erasable, nonvolatile memory (e.g., a flash memory or an EEPROM) and updated as required. By multiplexing the updated control program to the broadcast signal, a user also can download the updated program from this signal.

To update the control program, however, the old control program first must be erased and then the new control program written to, for example, a flash memory. The program for this processing, therefore, must operate independently of the control program. A characteristic of flash memory, moreover, is that, although erasing and updating data in certain memory blocks is possible, reading data from, or writing data to, some blocks while erasing other blocks is impossible. Therefore, the program for executing update processing must be present in a memory different from that storing the control program being updated.

Figure 2:
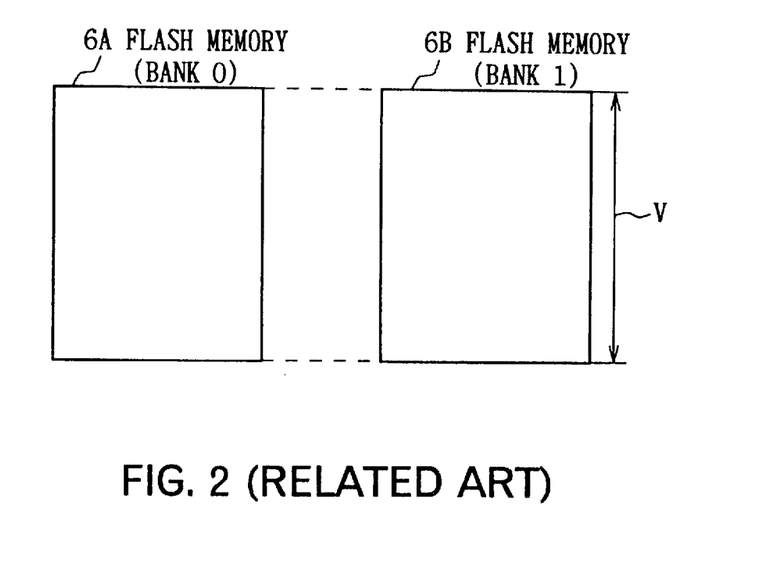
FIG. 2 is a schematic diagram of the two-bank method.

To solve this problem, the two-bank updating method and the RAM (random access memory) updating method have been used. The two-bank method uses two banks of flash memory. One bank stores the control program, and the other bank receives the new control program. FIG. 2 illustrates the two-bank method. Two flash memories 6A (bank 0) and 6B (bank 1) each have a memory capacity V and the same structure. A control program, stored in either bank 0 or bank 1, is executed during normal operation. In this case, it is assumed that the control program is stored in bank 0.

To update this control program, a new control program is downloaded in accordance with a program for executing update processing stored in bank 0. This new control program is written to bank 1. The system then executes the new control program from bank 1. When updating of the control program is again required, the program for executing update processing stored in bank 1 is executed, and the new control program is written to bank 0. Thus, by using two identical flash memories and alternately performing write and read operations to and from these memories, the control program can be updated as required.

A problem with the two-bank method, however, is that one flash memory is used only during update processing. Therefore, twice the flash-memory capacity needed for normal processing is required. Moreover, since hardware for independently operating both banks of flash memory must be present, the structure is complex.

Figure 3:
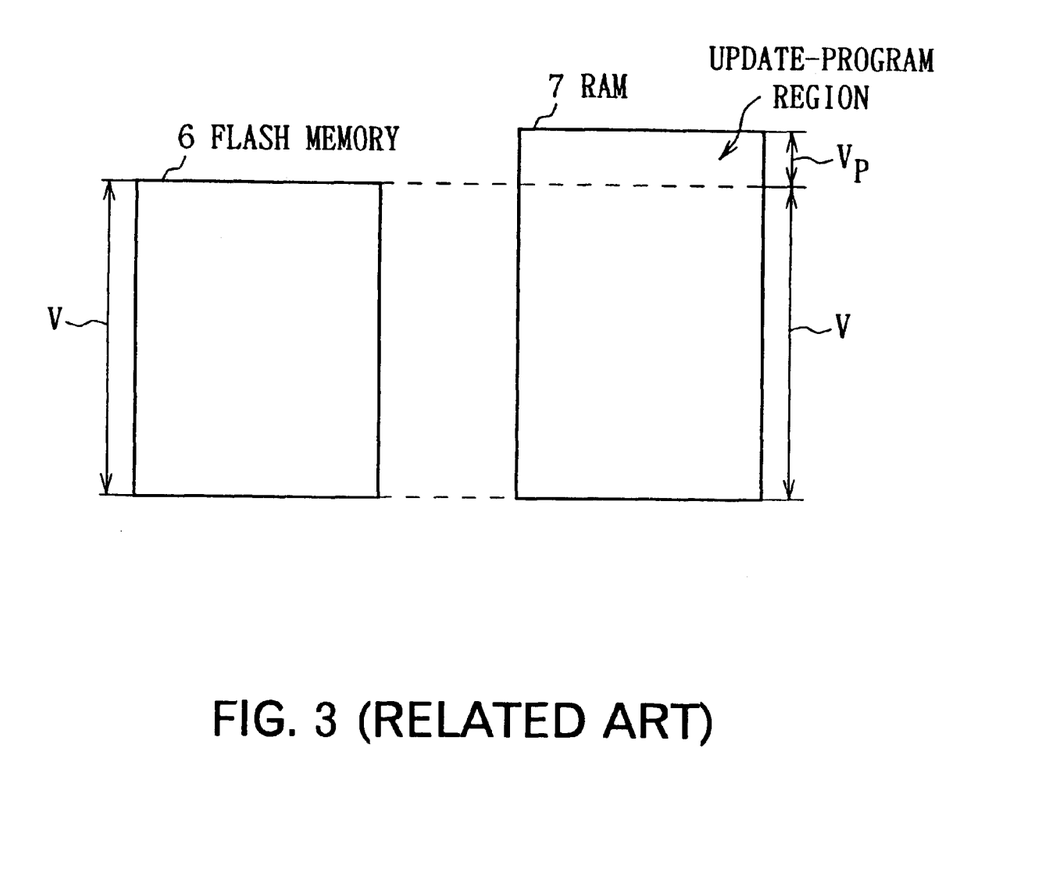
FIG. 3 is a schematic diagram of the RAM method.

The RAM method uses only one flash memory. The new control program initially is downloaded into a RAM, and the system then copies this program to the flash memory. FIG. 3 illustrates this method. To perform update processing, the control program in flash memory 6 is executed to write a new control program in RAM 7. After this write operation is completed, an update program, also stored in RAM 7, is executed to erase the old control program in flash memory 6. The new control program then is written from RAM 7 to flash memory 6.

Although only one flash memory is required in the RAM method, the RAM requires a region V for storing the control program and a region Vp for storing the update program. The necessary capacity of RAM 7, therefore, is large. Moreover, the contents of RAM 7 may be lost if a power outage occurs at any time beginning with the erasing of data from flash memory 6 through the writing of a new control program in flash memory 6. If the control program is lost, the functions of digital broadcasting receiver 4 also may be lost.

SUMMARY OF THE INVENTION

An object of the present invention, therefore, is to provide a system and method for updating a receiver's control program having a simple structure and means for preventing the loss of functions due to a power outage during such updating.

The foregoing object and other objects of the invention are achieved by providing a receiver for a broadcast signal with an erasable, nonvolatile memory as a first storage means and a volatile memory as a second storage means. The first storage means stores the control program. The receiver also includes means for obtaining from the broadcast signal an updated version of the control program and a second program for loading and storing the updated version of the control program. The receiver has a processing unit for processing the control program, the updated version of the control program and the second program. The processing unit is operative to process the control program from the first storage means to download from the broadcast signal the second program and store this program in the second storage means and to process the second program from the second storage means to download the updated version of the control program from the broadcast signal and replace in the first storage means the control program with this updated version.

The nature, principle and utility of the invention will be better understood from the following detailed description, when read in conjunction with the accompanying drawings. Like parts are designated by like reference numerals or characters.

DETAILED DESCRIPTION OF THE PREFERRED EMBODIMENTS

Figure 4:
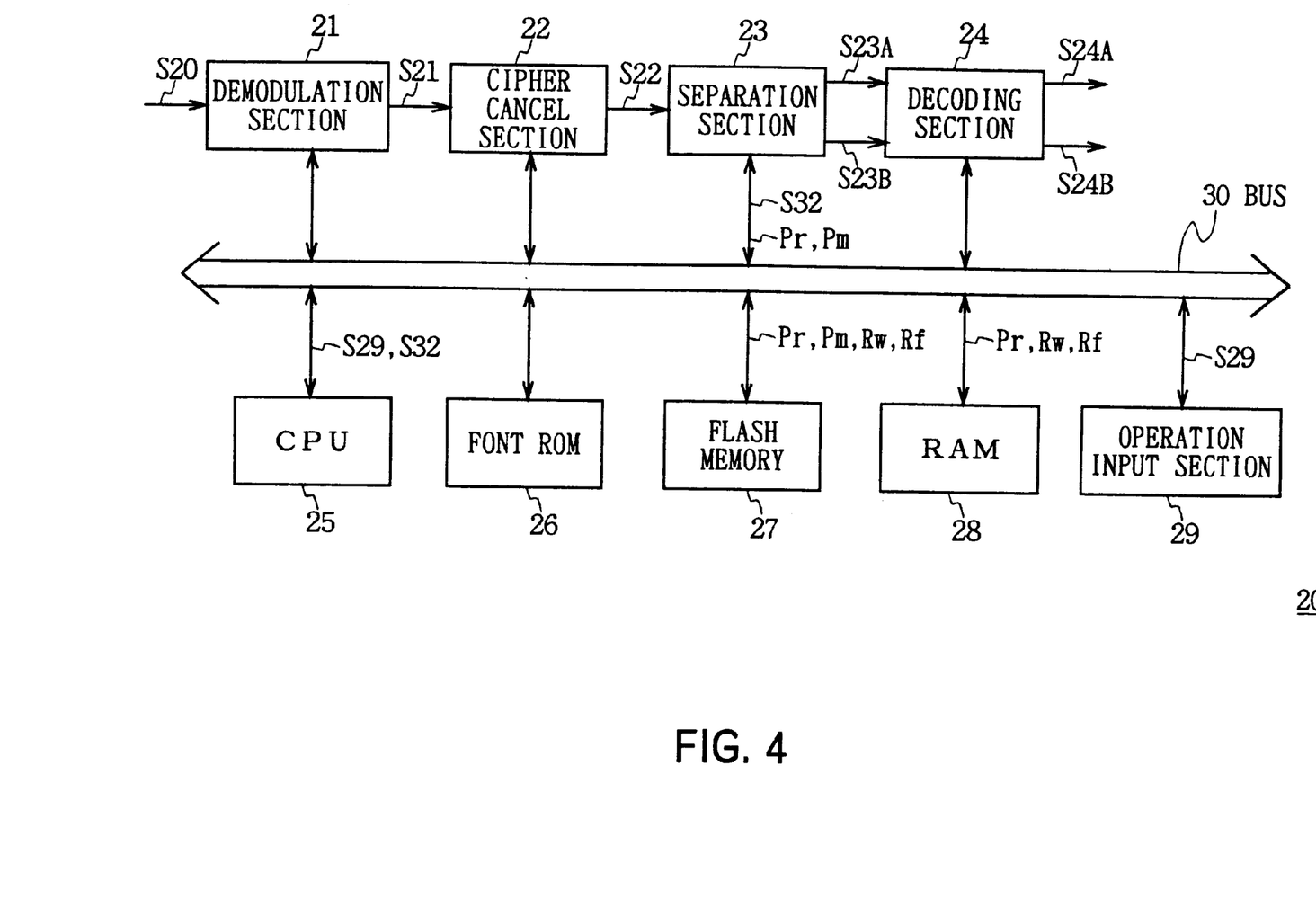
FIG. 4 is a block diagram of a digital-broadcasting receiver constructed in accordance with the present invention.

Referring to FIG. 4, reference numeral 20 denotes a digital broadcasting receiver having a demodulation section 21, a cipher cancel section 22, a separation section 23, a decoding section 24, a CPU (central processing unit) 25 (e.g., a microprocessor), a font ROM (read only memory) 26, a flash memory 27, a RAM (random access memory) 28 and an operation input section 29. These components communicate among each other through bus 30. CPU 25 controls all of the functions of digital broadcasting receiver 20.

During normal operations, demodulation section 21 receives and demodulates digital broadcast signal S20. Signal S20 can be a television signal transmitted from a broadcasting satellite (not illustrated) in a predetermined format. This signal is received by an antenna (also not illustrated) connected to demodulation section 21. Demodulation section 21 demodulates signal S20 and transmits demodulated signal S21 to cipher cancel section 22. Cipher cancel section 22 cancels the cipher in signal S21, in accordance with a predetermined method, and transmits the resulting signal S22 to the separation section 23. The separation section 23 selects one channel, from among a plurality of multiplexed channels constituting signal S22, and transmits the video and audio data of this selected channel to decoding section 24 as encoded video data S23A and encoded audio data S23B. Decoding section 24 decodes the encoded video data S23A and the encoded audio data S23B, in accordance with, for example, the MPEG2 and MPEG standards, and transmits the resulting signals as video signal S24A and audio signal S24B.

Figure 5:
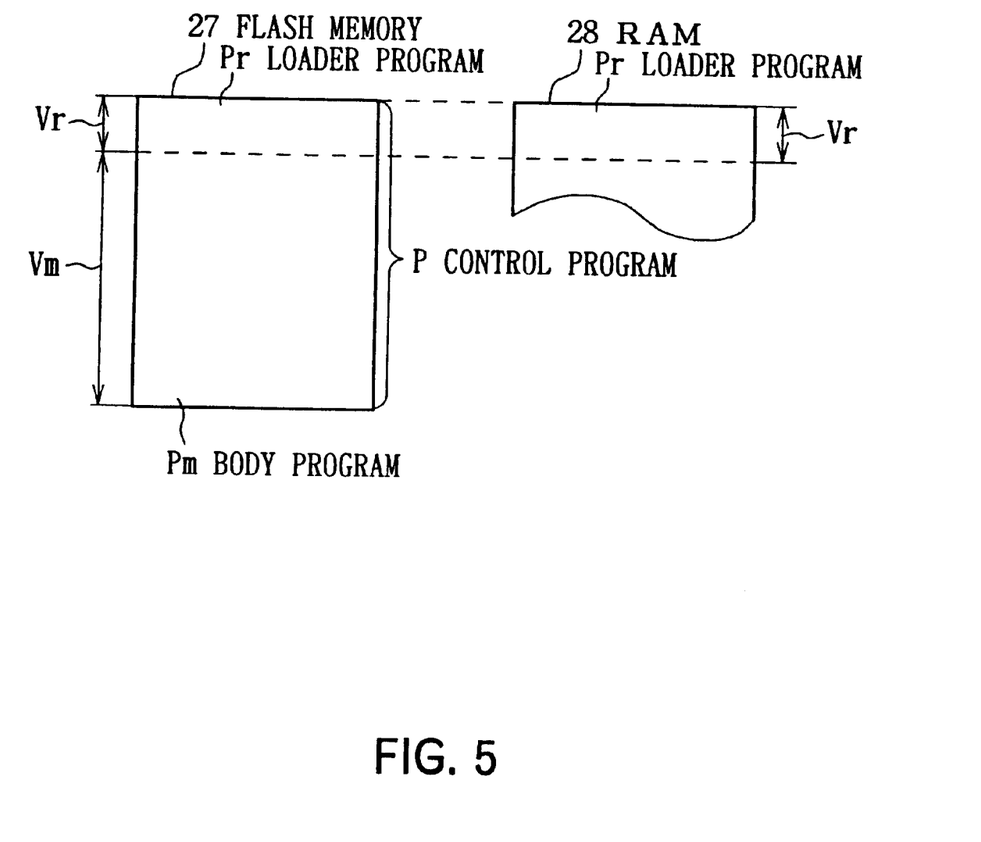
FIG. 5 is a schematic diagram of a flash memory and a RAM in accordance with the present invention.

During operation of digital broadcasting receiver 20, CPU 25 executes a control program P stored in flash memory 27. This memory is illustrated in FIG. 5. Control program P comprises a body program Pm for processing normal receiving operations and a loader program Pr for downloading body program Pm. Because the loader program's function is only to download and store the body program, the memory size Vr for the loader program is less than the memory size Vm for the body program.

Figure 6:
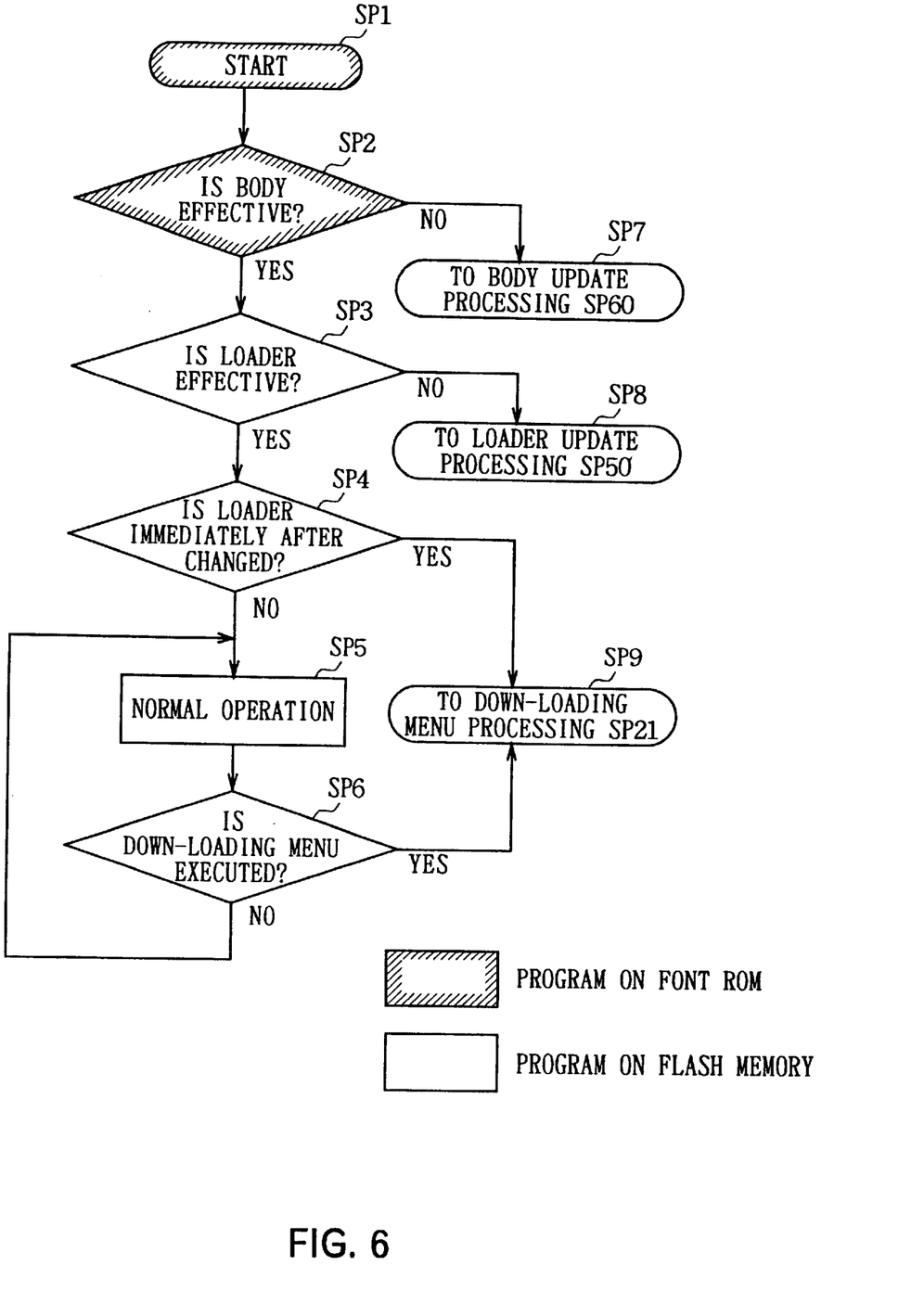
FIG. 6 is a flowchart of the principle processing steps of a CPU programmed in accordance with the present invention.

A flowchart of the principal processing steps of CPU 25 is shown in FIG. 6. CPU 25 starts processing in step SP1 and, in step SP2, decides whether body program Pm is valid (e.g., is the latest version of the program). This decision is based upon the status of a body flag stored in flash memory 27. The processing of steps SP1 and SP2 is performed by executing a start program Pb written in an empty region of font ROM 26 (FIG. 4). Because the body flag is normally set to "valid," an affirmative result normally is obtained in step SP2, and the processing of step SP3 is started. The processing of step SP3, and that of the subsequent steps illustrated in FIG. 6, are performed by executing the body program Pm stored in flash memory 27.

In step SP3, CPU 25 decides, based upon the status of a loader flag stored in flash memory 27, whether loader program Pr is valid. Because the loader flag normally is set to "valid," an affirmative result normally is obtained in step SP3, and the processing of step SP4 is started.

In step SP4, CPU 25 decides whether loader program Pr is an immediately-after-being-changed state, that is, in a state immediately after being downloaded, based upon the status of an immediately-after-loader-change flag stored in flash memory 27. Because the immediately-after-loader-change flag normally is set to "invalid," a negative result normally is obtained in step SP4, and the processing in step SP5 is started. In step SP5, normal broadcast receiving operations are performed.

In step SP6, CPU 25 monitors, during normal broadcast receiving operations, for the presence or absence of a user's downloading command signal S29 from the operation input section 29 (FIG. 4). This signal is generated in response to a user's command from an input controller (not shown) to download a new control program. CPU 25 also monitors for execution of a downloading menu displayed on a television receiver (not shown) receiving signals from digital broadcasting receiver 20.

If the downloading command signal S29 is not detected in step SP6, step SP5 is reexecuted and normal receiving operations are continued. If the downloading command signal S29 is detected in step SP6, however, the processing in step SP9 is started, and downloading menu processing, as shown in FIG. 7, is executed.

Figure 7:
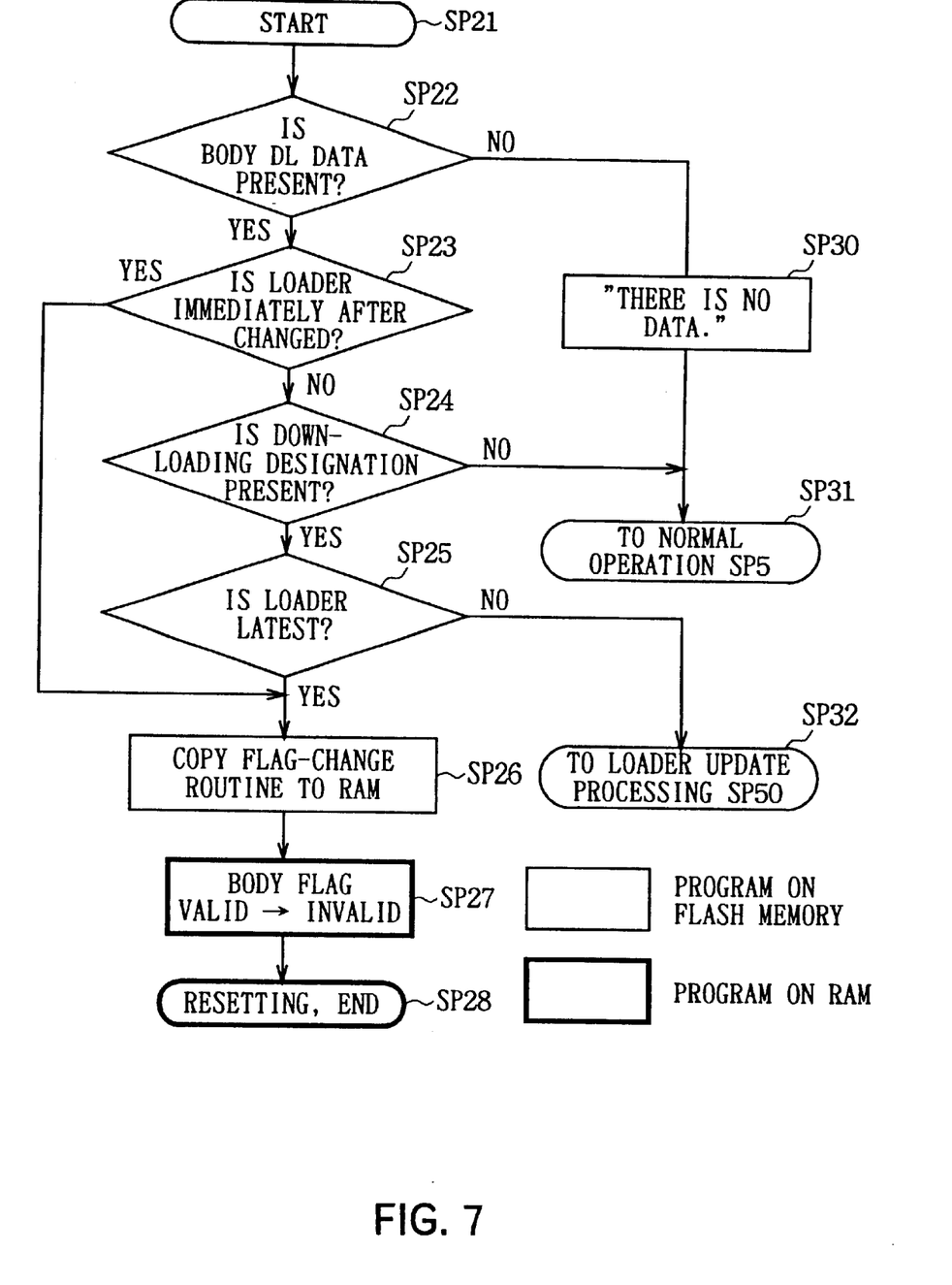
FIG. 7 is a flowchart of the processing steps for downloading menu processing.

Referring to FIG. 7, CPU 25 starts processing in step SP21 and decides, in step SP22, whether body program Pm is multiplexed to broadcast signal S20. This decision is based upon the status of the multiplexed information S32 received from separation section 23 (FIG. 4). A negative result means that the body program Pm is not multiplexed to the broadcast signal S20. In such event, the processing in step SP30 is started to display a message on a display section (not illustrated) of digital broadcasting receiver 20 (FIG. 4) that no data exists. The processing in step SP31 then is started to stop downloading menu processing, and normal operations are restarted in step SP5 (FIG. 6).

If an affirmative result is obtained in step SP22 of FIG. 7, however, such result means that the body program Pm is multiplexed to the broadcast signal S20. Therefore, the processing in step SP23 is started. In step SP23, CPU 25 decides, based upon the status of the immediately-after-loader-change flag stored in flash memory 27, whether the loader program Pr is in an immediately-after-being-changed state, that is, in a state immediately after being downloaded. Because the immediately-after-loader-change flag normally is set to "invalid," a negative result normally is obtained in step SP23, and the processing in step SP24 is started.

In step SP24, CPU 25 again monitors for the presence or absence of a user's downloading command signal. If CPU 25 determines that the user has not executed such a command signal, a negative result is obtained, and step SP31 is started. The normal operations of step SP5, shown in FIG. 6, therefore, are restarted.

If an affirmative result is obtained in step SP24 of FIG. 7, however, the processing in step SP25 is started. In step SP25, CPU 25 determines whether the loader program Pr is the latest version of the loader program. If an affirmative result is obtained in step SP25, such result means that the version of the loader program Pr currently written in flash memory 27 is the latest version of this program. In such case, downloading of the loader program Pr is unnecessary. The processing in step SP26, therefore, is started.

If a negative result is obtained in step SP25, however, such result means that the version of the loader program Pr currently written in flash memory 27 is not the latest version of this program. The processing in step SP32, therefore, is started, and CPU 25 executes the loader update processing shown in FIG. 8. This processing updates the loader program Pr written in flash memory 27 to the latest program.

Figure 8:
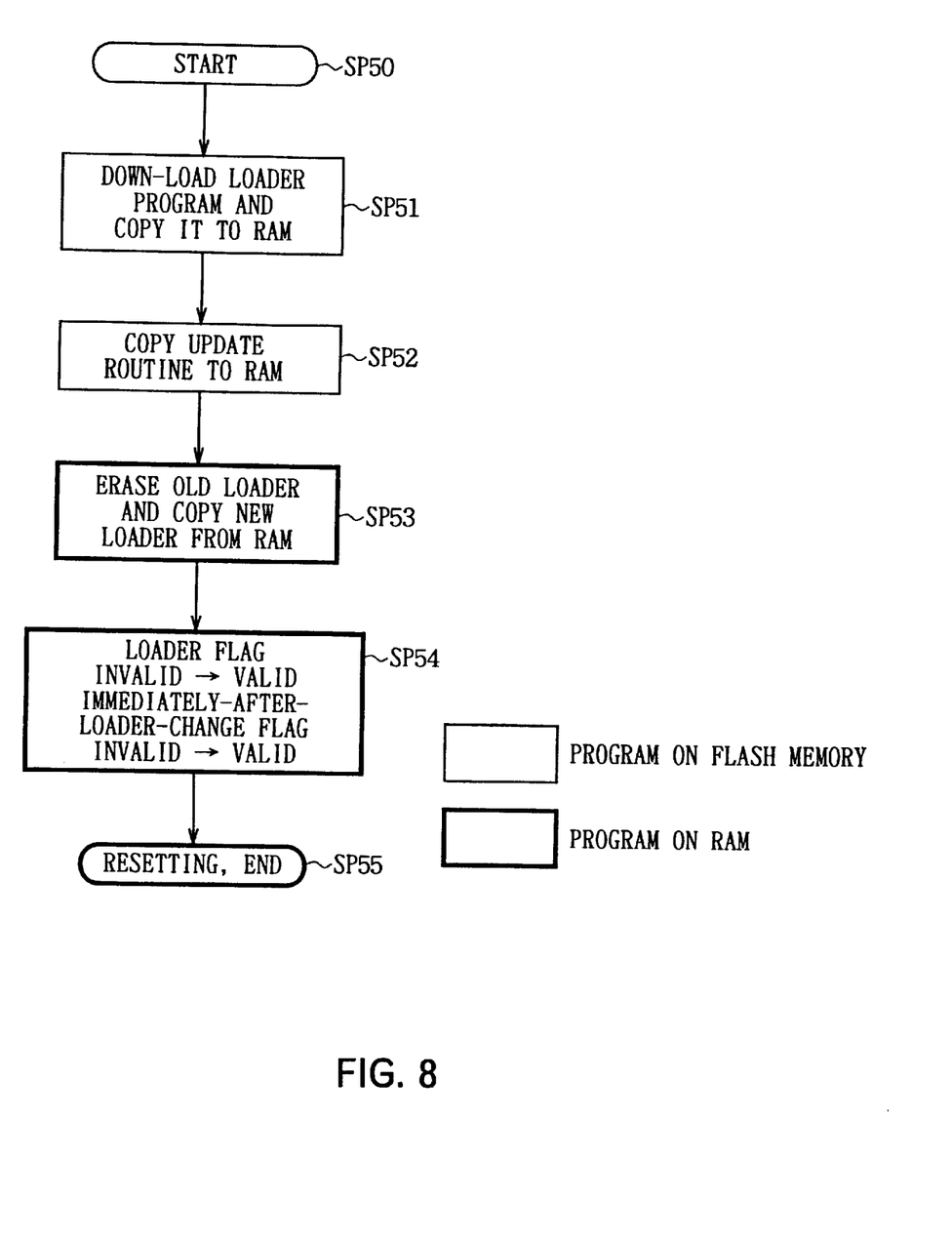
FIG. 8 is a flowchart of the processing steps for loader update processing.

Referring to FIG. 8, CPU 25 starts processing in step SP50 and, in step SP51, downloads the new loader program. CPU 25 writes the new loader program Pr in RAM 28. This program is separated from the multiplexed signal S22 by separation section 23 (FIG. 4). In step SP52, CPU 25 copies to RAM 28 a loader updating routine Rw included in body program Pm stored in flash memory 27. Subsequent processing of the loader updating routine Rw is from RAM 28.

In step SP53, CPU 25 processes the loader updating routine Rw from RAM 28 to erase the old loader program Pr written in flash memory 27 and copy the new loader program Pr written in RAM 28 to flash memory 27. In step SP54, CPU 25 changes the loader flag stored in flash memory 27 from "invalid" to "valid" and the immediately-after-loader-change flag stored in flash memory 27 from "invalid" to "valid." In step SP55, CPU 25 resets the digital broadcasting receiver 20 to continue main processing (FIG. 6).

Upon the resumption of main processing, the loader flag in flash memory 27 and the immediately-after-loader-change flag in flash memory 27 now are set to "valid." After performing the processing of steps SP1, SP2, SP3 and SP4, therefore, the processing of step SP9 is performed. This processing results in downloading menu processing, shown in FIG. 7, being executed. In this case, however, the immediately-after-loader-change flag for the loader program Pr is set to "valid." If the body program Pm is multiplexed to the broadcast signal S20, therefore, the processing in step SP26 is started.

In step SP26, CPU 25 copies a flag-change routine Rf included in body program Pm stored in flash memory 27 to RAM 28. Subsequent processing of the flag-change routine Rf is from RAM 28. The processing of this routine causes the body flag of the body program Pm to be set to "invalid" in step SP27. The digital broadcasting receiver 20 then is reset in step SP28, and the processing of FIG. 7 is complete.

CPU 25 then performs processing again in accordance with the flowchart of FIG. 6. In this case, however, because the body flag of the body program Pm is set to "invalid," the processing in step SP7 is started, and body update processing is executed (FIG. 9).

Figure 9:
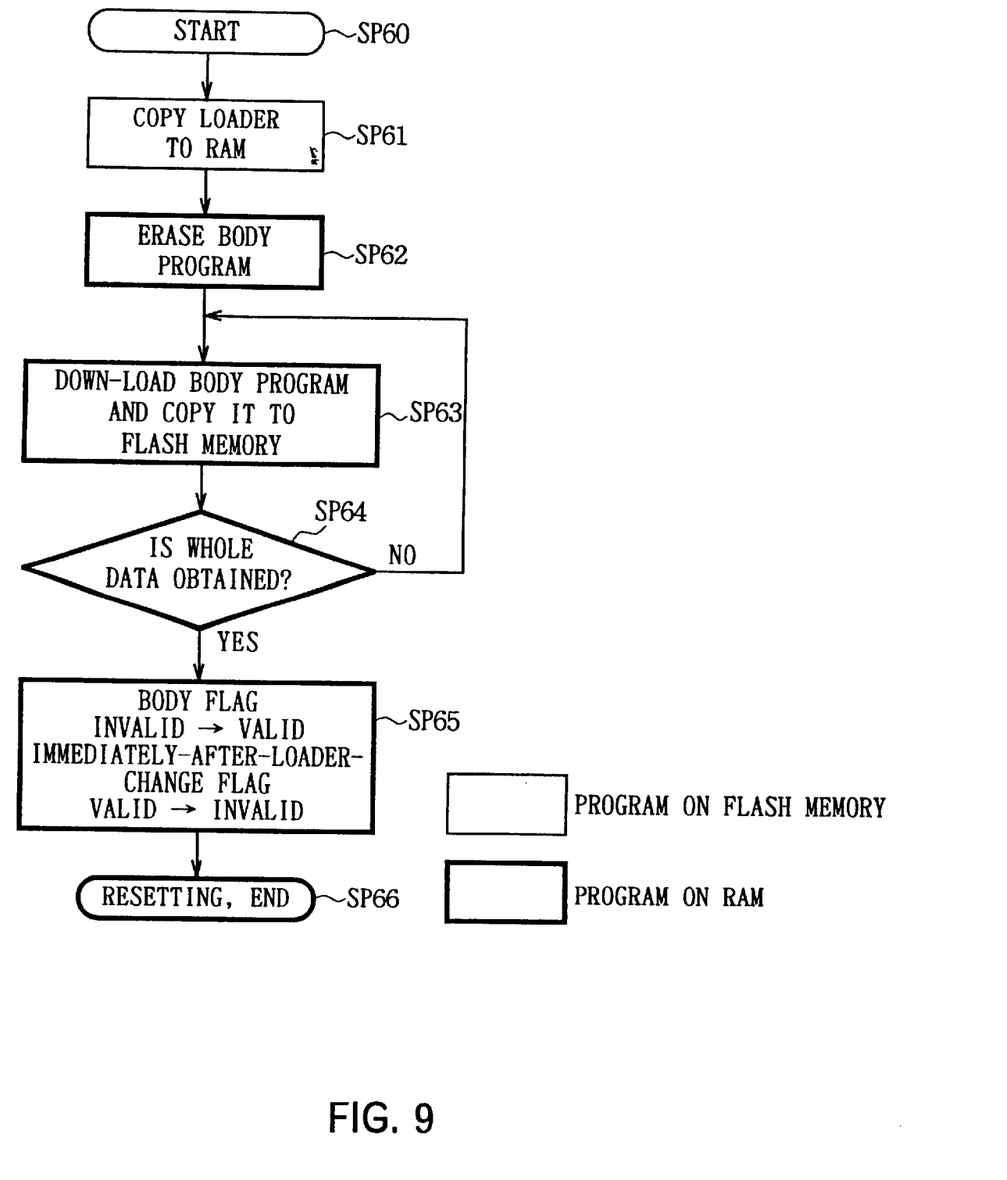
FIG. 9 is a flowchart of the processing steps for body update processing.

As shown in FIG. 9, CPU 25 starts processing in step SP60 and, in step SP61, copies the loader program Pr in flash memory 27 to RAM 28. Subsequent processing of the loader program Pr is from RAM 28. The execution of loader program Pr causes CPU 25, in step SP62, to erase the old body program Pm in flash memory 27 and, in step SP63, to download the new body program Pm, separated from the multiplexed signal S22 by separation section 23, to flash memory 27.

In step SP64, CPU 25 determines whether all of the data comprising the new body program Pm are downloaded. If a negative result is obtained, such result means that the entire body program was incompletely or incorrectly downloaded. The processing in step SP63 is repeated, therefore, to again download the new body program Pm. If an affirmative result is obtained, however, such result means that the entire new body program Pm was correctly downloaded. Thus, the processing in step SP65 is started.

In step SP65, CPU 25 changes the body flag stored in flash memory 27 from "invalid" to "valid" and changes the immediately-after-loader-change flag stored in flash memory 27 from "valid" to "invalid." In step SP66, CPU 25 completes the processing of FIG. 8, and digital broadcasting receiver 20 is reset. The body program Pm in flash memory 27, therefore, is updated, and update processing of control program P is complete.

CPU 25 thereafter performs processing again in accordance with the flowchart of FIG. 6. In this case, however, the body flag in flash memory 27 and the loader flag in flash memory 27 are set to "valid," and the immediately-after-loader-change flag is set to "invalid." The processing in step SP5, therefore, is resumed, and normal broadcast receiving operations are performed.

As described above, to update control program P of digital broadcasting receiver 20, the loader program Pr is first downloaded and written to RAM 28. Thereafter, the loader program Pr is copied from RAM 28 to flash memory 27.

To update body program Pm, the new loader program Pr in flash memory 27 is copied back to RAM 28, and the new loader program Pr is executed from RAM 28. The updated body program Pm is downloaded and written to flash memory 27.

If loader update processing is interrupted due to a power outage or the like, the loader program Pr in RAM 28 or flash memory 27 may be lost or corrupted. However, the start program Pb in font ROM 26 and the body program Pm in flash memory 27 remain intact. Under such circumstances, the loader flag stored in flash memory 27 is set to "invalid," and a negative result is obtained in step SP3 (FIG. 6) when digital broadcasting receiver 20 is restarted. Loader update processing, therefore, is reexecuted to correctly download the new loader program Pr.

Similarly, if body update processing is interrupted due to a power outage or the like, the body program Pm in flash memory 27 may be lost or corrupted. However, the start program Pb on font ROM and the loader program Pr in flash memory 27 remain intact. Under these circumstances, the body flag stored in flash memory 27 is set to "invalid," and a negative result is obtained in step SP2 (FIG. 6) when digital broadcasting receiver 20 is restarted. Body update processing, therefore, is reexecuted to correctly download the new body program Pm.

As described above, control program P of digital broadcasting receiver 20 is divided into body program Pm for processing normal receiving operations and loader program Pr for downloading body program Pm. To update control program P, loader program Pr is first downloaded into RAM 28. The loader program also is executed from RAM 28 to download the body program Pm. If update processing of the loader program or body program is interrupted due to a power outage or the like, neither the loader program nor the body program is lost. Although the above embodiments are described in connection with a receiver for digital satellite broadcasting, the present invention is not restricted to such receivers. The present invention can be used in receivers used for other applications (e.g., modems, cellular telephones, portable computers, etc.) or for other types of broadcasting, including digital wired broadcasting and digital ground-wave broadcasting.

Also, although the start program Pb in the above embodiments is written in an empty region of a font ROM, the present invention is not restricted to such a scheme. The start program Pb could be written in other storage devices or locations. Furthermore, although the above embodiments store the body flag, loader flag and immediately-after-loader-change flag in a flash memory, these flags could be stored in other types of memories, for example, EEPROMs, provided such memories are non-volatile. The control program P also could be written in an erasable, non-volatile memory device other than a flash memory (e.g., an EEPROM), and the loader program Pr could be written in a memory device other than a RAM. Also, a volatile memory with a backup power supply (e.g., a battery) could be employed in place of a non-volatile memory.

As described above, the present invention enables updating of a control program for a receiver, particularly a broadcasting receiver, without loss of all or part of the control program as a result of a power outage. A first storage means comprising an erasable, non-volatile memory and a second storage means comprising a volatile memory are employed. The control program is stored in the first storage means and is executed to obtain a second program for performing processing to obtain an updated version of the control program. The second program is downloaded to the second storage means, copied from the second storage means to the first storage means to preserve it, copied again from the first storage means to the second storage means and then executed from the second storage means to obtain the updated control program. The control program is written into the first storage means.

While the invention has been described in connection with preferred embodiments, it will be obvious to those skilled in the art that various changes or modifications may be employed and that such changes or modifications are within the spirit and scope of the invention as defined by the following claims.

What is claimed is:

1. A receiver for receiving a broadcast signal and for transmitting said signal to a device for display, said receiver being operated in accordance with a predetermined control program and comprising:
    a first memory storing said control program;
    a second memory;
    a demultiplexer for separating from said broadcast signal an updated version of said control program and a second program for downloading and storing said updated version of said control program; and
    a processing unit for processing said control program, said updated version of said control program and said second program, said processing unit being operative to process said control program from said first memory to load said second program into said second memory and to process said second program from said second memory to replace in said first memory said control program with said updated version of said control program.

2. A receiver as in claim 1, wherein said processing unit is further operative to copy said second program from said second memory to said first memory.

3. A receiver as in claim 1, wherein said first memory comprises an erasable, non-volatile memory and said second memory comprises a volatile memory.

4. A receiver as in claim 3, wherein said first memory comprises a flash memory or an EEPROM and said second memory comprises a RAM.

5. A receiver for receiving a broadcast signal and for transmitting said signal to a device for display, said receiver being operated in accordance with a predetermined control program and comprising:
    a first memory storing said control program and a second program for downloading from said broadcast signal an updated version of said control program;
    a second memory; and
    a processing unit for processing said control program, said updated version of said control program and said second program, said processing unit being operative to copy said second program from said first memory to said second memory and to process said second program from said second memory to replace in said first memory said control program with said updated version of said control program.

6. A receiver as in claim 5, wherein said processing unit is further operative to process said control program from said first memory to download from said broadcast signal said second program into said second memory.

7. A receiver as in claim 6, wherein said processing unit is further operative to copy said second program from said second memory to said first memory.

8. A receiver as in claim 5, wherein said first memory comprises an erasable, non-volatile memory and said second memory comprises a volatile memory.

9. A receiver as in claim 8, wherein said first memory comprises a flash memory or an EEPROM and said second memory comprises a RAM.

10. A receiver operated in accordance with a predetermined control program and a second program for obtaining and storing an updated version of said control program, said receiver comprising:
    a first memory storing a starter program for determining the validity of said control program;
    a second memory storing said control program;
    a third memory; and
    a processing unit for processing said starter program, said control program, said updated version of said control program and said second program, said processing unit being operative to process said starter program from said first memory to determine the validity of said control program, to process said control program from said second memory to load said second program into said third memory and to process said second program from said third memory to replace in said second memory said control program with said updated version of said control program.

11. A receiver as in claim 10, wherein said processing unit is further operative to process said control program from said second memory to download from a broadcast signal received by said receiver said second program into said third memory.

12. A receiver as in claim 11, wherein said processing unit is further operative to process said second program from said third memory to download from said broadcast signal said updated version of said control program into said second memory.

13. A receiver as in claim 10, wherein said processing unit is further operative to copy said second program from said third memory to said second memory.

14. A receiver as in claim 10, wherein said first and second memories comprise non-volatile memories and said third memory comprises a volatile memory.

15. A receiver as in claim 14, wherein said first memory comprises a ROM, said second memory comprises a flash memory or an EEPROM and said third memory comprises a RAM.

16. A receiver for receiving a broadcast signal, said receiver being operated in accordance with a predetermined control program and a second program for obtaining and storing an updated version of said control program, said receiver comprising:
    a first memory storing said control program;
    a second memory; and
    a processing unit for processing said control program, said updated version of said control program and said second program, said processing unit being operative to process said control program from said first memory to load said second program into said second memory and to process said second program from said second memory to download from said broadcast signal said updated version of said control program and to replace in said first memory said control program with said updated version of said control program.

17. A receiver as in claim 16, wherein said processing unit is further operative to process said control program from said first memory to download from said broadcast signal said second program into said second memory.

18. A receiver as in claim 16, wherein said processing unit is further operative to copy said second program from said second memory to said first memory.

19. A receiver as in claim 16, wherein said first memory comprises an erasable, non-volatile memory and said second memory comprises a volatile memory.

20. A receiver as in claim 19, wherein said first memory comprises a flash memory or an EEPROM and said second memory comprises a RAM.

21. A method for updating a control program for a receiver, said receiver receiving a broadcast signal and transmitting said signal to a device for display, said method comprising:
storing said control program in a first memory;
obtaining from said broadcast signal an updated version of said control program and a second program for downloading and storing said updated version of said control program;
processing said control program from said first memory to load said second program into a second memory; and
processing said second program from said second memory to download from said broadcast signal said updated version of said control program and replace in said first memory said control program with said updated version of said control program.

22. A method as in claim 21, further comprising copying said second program from said second memory to said first memory.

23. A method as in claim 21, wherein said first memory comprises an erasable, non-volatile memory and said second memory comprises a volatile memory.

24. A method as in claim 23, wherein said first memory comprises a flash memory or an EEPROM and said second memory comprises a RAM.

25. A method for updating a control program for a receiver, said receiver receiving a broadcast signal and transmitting said signal to a device for display, said method comprising:
storing in a first memory said control program and a second program for downloading from said broadcast signal an updated version of said control program;
copying said second program from said first memory to a second memory; and
processing said second program from said second memory to replace in said first memory said control program with said updated version of said control program.

26. A method as in claim 25, further comprising processing said control program from said first memory to download from said broadcast signal said second program into said second memory.

27. A method as in claim 26, further comprising copying said second program from said second memory to aid first memory.

28. A method as in claim 25, wherein said first memory comprises an erasable, non-volatile memory and aid second memory comprises a volatile memory.

29. A method as in claim 28, wherein said first memory comprises a flash memory or an EEPROM and said second memory comprises a RAM.

30. A method for updating a control program for a receiver, said receiver operating in accordance with said control program and a second program for obtaining and storing an updated version of said control program, said method comprising:
storing in a first memory a starter program for determining the validity of said control program;
storing said control program in a second memory;
processing said starter program from said first memory to determine the validity of said control program;
processing said control program from said second memory to load said second program into a third memory; and
processing said second program from said third memory to replace in said second memory said control program with said updated version of said control program.

31. A method as in claim 30, further comprising processing said control program from said second memory to download from a broadcast signal received by said receiver said second program into said third memory and processing said second program from said third memory to download from said broadcast signal said updated version of said control program into said second memory.

32. A method as in claim 30, further comprising copying said second program from said third memory to said second memory.

33. A method as in claim 30, wherein said first and second memories comprise non-volatile memories and said third memory comprises a volatile memory.

34. A method as in claim 33, wherein said first memory comprises a ROM, said second memory comprises a flash memory or an EEPROM and said third memory comprises a RAM.

35. A method for updating a control program for a receiver of a broadcast signal, said receiver operating in accordance with said control program and a second program for obtaining and storing an updated version of said control program, said method comprising:
storing said control program in a first memory;
processing said control program from said first memory to load said second program into said second memory; and
processing said second program from said second memory to download from said broadcast signal said updated version of said control program and replace in said first memory said control program with said updated version of said control program.

36. A method as in claim 35, further comprising processing said control program from said first memory to download from said broadcast signal said second program into said second memory.

37. A method as in claim 35, further comprising copying said second program from said second memory to said first memory.

38. A method as in claim 35, wherein said first memory comprises an erasable, non-volatile memory and said second memory comprises a volatile memory.

39. A method as in claim 38, wherein said first memory comprises a flash memory or an EEPROM and said second memory comprises a RAM.

* * * * *

UNITED STATES PATENT AND TRADEMARK OFFICE
CERTIFICATE OF CORRECTION

PATENT NO. : 6,343,379 B1
DATED : January 29, 2002
INVENTOR(S) : Ozawa et al.

Page 1 of 1

It is certified that error appears in the above-identified patent and that said Letters Patent is hereby corrected as shown below:

Column 6,
Line 47, after "is lost." insert a new paragraph before "Although".

Column 9,
Lines 63 and 66, "aid" should read -- said --.

Signed and Sealed this

Twenty-eighth Day of May, 2002

Attest:

Attesting Officer

JAMES E. ROGAN
Director of the United States Patent and Trademark Office